(12) United States Patent
Ryu et al.

(10) Patent No.: US 11,800,591 B2
(45) Date of Patent: Oct. 24, 2023

(54) SIDELINK DRX AND STANDALONE SIDELINK BEAM FAILURE DETECTION AND RECOVERY

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/344,733

(22) Filed: Jun. 10, 2021

(65) Prior Publication Data
US 2021/0392717 A1 Dec. 16, 2021

Related U.S. Application Data

(60) Provisional application No. 63/038,513, filed on Jun. 12, 2020.

(51) Int. Cl.
*H04W 76/19* (2018.01)
*H04W 24/10* (2009.01)
(Continued)

(52) U.S. Cl.
CPC .......... *H04W 76/19* (2018.02); *H04L 5/0051* (2013.01); *H04W 24/10* (2013.01); *H04W 76/28* (2018.02); *H04W 74/0833* (2013.01)

(58) Field of Classification Search
CPC ..... H04W 76/19; H04W 76/28; H04W 24/10; H04W 74/0833; H04W 36/0033;
(Continued)

(56) References Cited

U.S. PATENT DOCUMENTS

2017/0331577 A1* 11/2017 Parkvall .................. H04W 4/00
2018/0337757 A1* 11/2018 Noh ....................... H04L 5/0092
(Continued)

FOREIGN PATENT DOCUMENTS

| WO | WO-2019141398 A1 * | 7/2019 | .......... H04B 7/0408 |
| WO | 2020013872 A1 | 1/2020 | |
| WO | WO-2020013872 A1 * | 1/2020 | ......... H04L 25/0226 |

OTHER PUBLICATIONS

Huawei, et al., "Beam Failure Detection in DRX" 3GPP Draft, 3GPP TSG-RAN WG2#103bis, R2-1813886, BFD in DRX, 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 28, 2018 (Sep. 28, 2018), XP051523356, 3 Pages, Retrieved from the Internet: URL: http://www.3gpp.org/ftp/tsg%5Fran/WG2%5FRL2/TSGR2%5F103bis/Docs/R2%2D1813886%2Ezip. [retrieved on Sep. 28, 2018] Sections 1, 2.
(Continued)

*Primary Examiner* — Ian N Moore
*Assistant Examiner* — Latresa A McCallum
(74) *Attorney, Agent, or Firm* — Patterson + Sheridan, L.L.P.

(57) ABSTRACT

Aspects of the present disclosure provide techniques for standalone sidelink beam failure recovery. A method performed by a first user equipment includes communicating, while operating in a sidelink discontinuous reception (DRX) mode, with a second UE on a first communications link between the first UE and the second UE; transmitting, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference
(Continued)

signals; and detecting that the first communications link between the first UE and the second UE has failed based on the at least one beam failure detection reference signal.

27 Claims, 10 Drawing Sheets

(51) Int. Cl.
*H04W 76/28* (2018.01)
*H04L 5/00* (2006.01)
*H04W 74/08* (2009.01)

(58) Field of Classification Search
CPC . H04W 36/0083; H04W 52/02; H04W 8/005; H04W 24/02; H04W 36/00; H04W 36/0088; H04W 40/24; H04W 52/365; H04W 72/08; H04L 5/0051; H04L 43/06
See application file for complete search history.

(56) References Cited

U.S. PATENT DOCUMENTS

| | | | |
|---|---|---|---|
| 2019/0028905 A1* | 1/2019 | Veeramallu | H04W 76/18 |
| 2019/0052337 A1* | 2/2019 | Kwon | H04W 74/006 |
| 2019/0174411 A1* | 6/2019 | Xu | H04W 52/0216 |
| 2020/0053824 A1 | 2/2020 | He | |
| 2020/0344722 A1* | 10/2020 | He | H04W 4/46 |

OTHER PUBLICATIONS

International Search Report and Written Opinion—PCT/US2021/037071—ISA/EPO—dated Sep. 15, 2021.
Nokia, et al., "Authorization and Provisioning to Support Power Saving Over PC5", 3GPP Draft, 3GPP TSG-WG SA2 Meeting #139E, S2-2004246, 3rd Generation Partnership Project (3GPP), Mobile Competence Centre, 650, Route Des Lucioles, F-06921 Sophia-Antipolis Cedex, France, vol. SA WG2, No. Electronic, Jun. 1, 2020-Jun. 12, 2020, May 22, 2020 (May 22, 2020), XP051890250, 2 Pages.

* cited by examiner

SIDELINK DRX AND STANDALONE SIDELINK BEAM FAILURE DETECTION AND RECOVERY

CROSS-REFERENCE TO RELATED APPLICATIONS

This application claims benefit of and priority to U.S. Provisional Application No. 63/038,513, filed Jun. 12, 2020, which is hereby assigned to the assignee hereof and hereby expressly incorporated by reference herein in its entirety as if fully set forth below and for all applicable purposes.

INTRODUCTION

Field of the Disclosure

Aspects of the present disclosure relate to wireless communications, and more particularly, to techniques for sidelink discontinuous reception (DRX) and standalone sidelink beam failure detection and recovery.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved standalone sidelink beam failure recovery.

Certain aspects of the subject matter described in this disclosure can be implemented in a method for wireless communication by a first user equipment (UE). The method generally includes communicating, while operating in a sidelink discontinuous reception (DRX) mode, with a second UE on a first communications link between the first UE and the second UE; transmitting, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and detecting that the first communications link between the first UE and the second UE has failed based on the at least one beam failure detection reference signal.

Certain aspects of the subject matter described in this disclosure can be implemented in an apparatus for wireless communications by a first user equipment (UE). The apparatus includes a memory comprising executable instructions and one or more processors configured to execute the executable instructions and cause the apparatus to communicate, while operating in a sidelink discontinuous reception (DRX) mode, with a second UE on a first communications link between the first UE and the second UE; transmit, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and detecting that the first communications link between the first UE and the second UE has failed based on the at least one beam failure detection reference signal. The apparatus may also include a memory coupled with the at least one processor.

Certain aspects of the subject matter described in this disclosure can be implemented in an apparatus for wireless communications by a first user equipment (UE). The apparatus generally includes means for communicating, while operating in a sidelink discontinuous reception (DRX) mode, with a second UE on a first communications link between the first UE and the second UE; means for transmitting, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and means for detecting that the first communications link between the first UE and the second UE has failed based on the at least one beam failure detection reference signal.

Certain aspects of the subject matter described in this disclosure can be implemented in a non-transitory computer-readable medium for wireless communications by a first user equipment (UE). The non-transitory computer-readable medium includes executable instructions that, when executed by one or more processors of an apparatus, cause the apparatus to communicate, while operating in a sidelink discontinuous reception (DRX) mode, with a second UE on a first communications link between the first UE and the second UE; transmit, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and detecting that the first communications link between the first UE and the second UE has failed based on the at least one beam failure detection reference signal.

Certain aspects of the subject matter described in this disclosure can be implemented in a method for wireless communication by a second user equipment (UE). The method generally includes communicating, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link; and monitoring, during the awake state of the sidelink DRX mode, for the plurality of beam failure detection reference signals according to the periodicity for receiving the plurality of beam failure detection reference signals.

Certain aspects of the subject matter described in this disclosure can be implemented in an apparatus for wireless communications by a second user equipment (UE). The apparatus includes a memory comprising executable instructions and one or more processors configured to execute the executable instructions and cause the apparatus to communicate, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link; and monitor, during the awake state of the sidelink DRX mode, for the plurality of beam failure detection reference signals according to the periodicity for receiving the plurality of beam failure detection reference signals. The apparatus may also include a memory coupled with the at least one processor.

Certain aspects of the subject matter described in this disclosure can be implemented in an apparatus for wireless communications by a second user equipment (UE). The apparatus generally includes means for communicating, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link; and means for monitoring, during the awake state of the sidelink DRX mode, for the plurality of beam failure detection reference signals according to the periodicity for receiving the plurality of beam failure detection reference signals.

Certain aspects of the subject matter described in this disclosure can be implemented in a non-transitory computer-readable medium for wireless communications by a second user equipment (UE). The non-transitory computer-readable medium includes executable instructions that, when executed by one or more processors of an apparatus, cause the apparatus to communicate, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link; and monitor, during the awake state of the sidelink DRX mode, for the plurality of beam failure detection reference signals according to the periodicity for receiving the plurality of beam failure detection reference signals.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
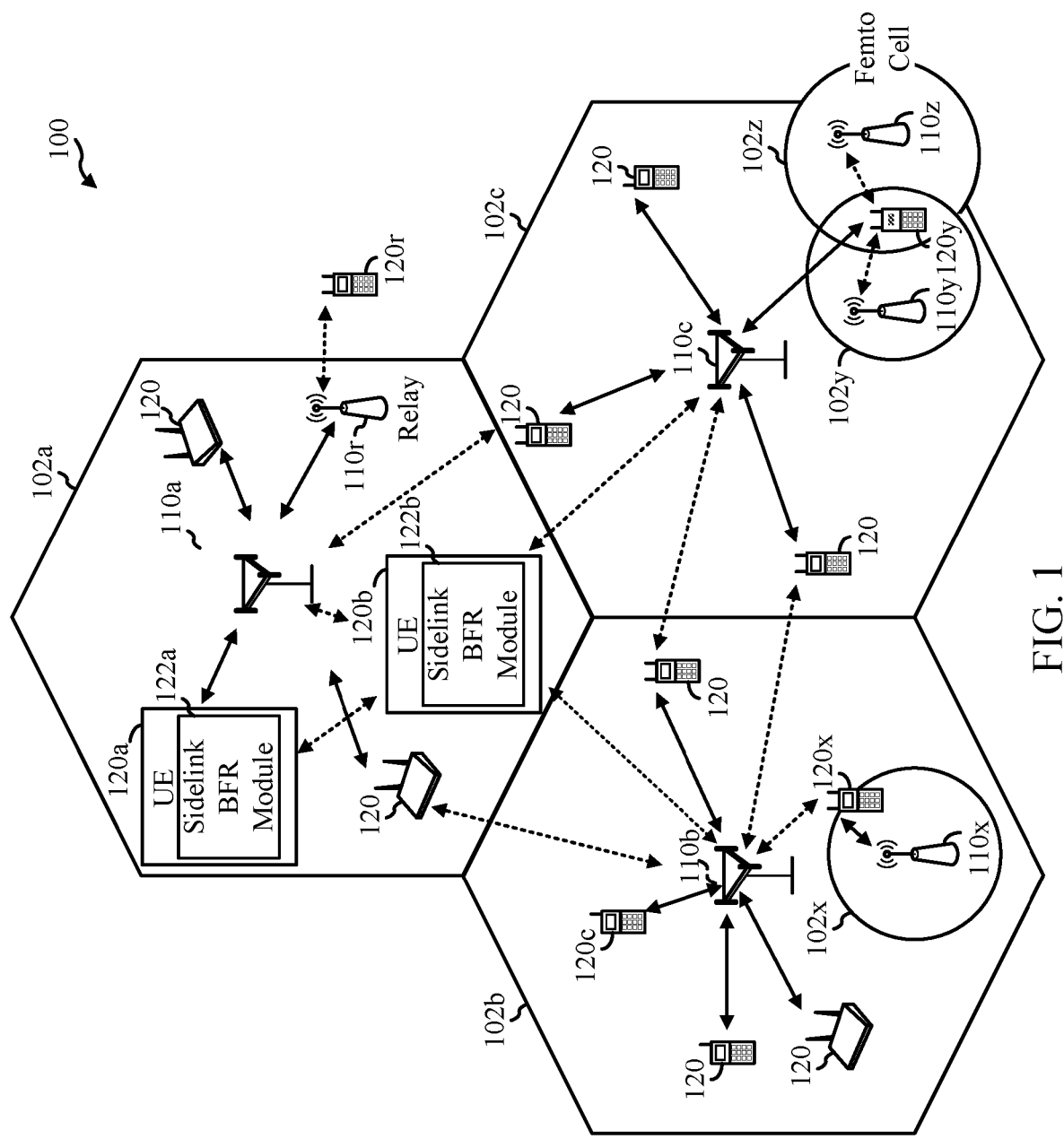
FIG. 1 is a block diagram conceptually illustrating an example wireless communication network, in accordance with certain aspects of the present disclosure.
Figure 1:
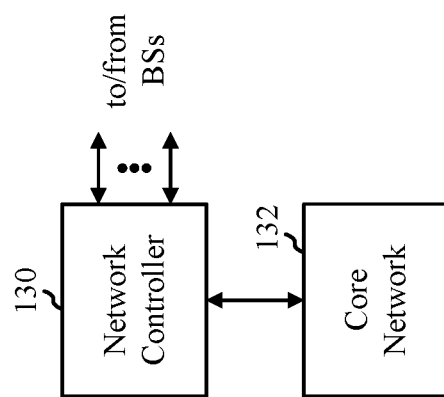

Aspects of the present disclosure provide apparatus, methods, processing systems, and computer readable mediums for sidelink discontinuous reception (DRX) and standalone sidelink beam failure detection and recovery. For example, in some cases, two user equipments in a wireless communication network may communicate with each other using a sidelink communication link/channel via one or more transmission beams and one or more reception beams. During sidelink communication, the UEs may also operate according to a DRX mode that allows each UE to transition to a sleep state to conserve power. However, operating in the sleep state of the DRX mode may interfere with resources for transmitting and receiving beam failure detection reference signals used to detect a failure of the sidelink communication link, which may result in a failure of the sidelink communication link not being detected. As a consequence, an undetected sidelink communication link failure may lead to unnecessary transmissions that will ultimately fail to be received and, as a consequence, wasted time and frequency resources in the wireless communication network as well as power resources at the UEs. Additionally, because the sleep state of the DRX mode may be different for the two UEs, it may be difficult for these UEs to reestablish the sidelink communication link.

Accordingly, to avoid interference between the DRX mode and the resources for the beam failure detection reference signals, aspects of the present disclosure provide techniques for configuring a periodicity associated with the DRX mode based on a periodicity associated with the resources for the beam failure detection reference signals. By basing the periodicity of the DRX mode on the periodicity associated with the resources for beam failure detection reference signals, a likelihood of interference between the DRX mode and the resources for beam failure detection reference signals may be reduced. As such, the likelihood of missing the detection of a failed sidelink communication link may also be reduced, which helps to avoid unnecessary transmission on a failed sidelink communication link (e.g., saving the time, frequency, and power resources) and help to quickly and efficiently reestablish the failed sidelink communication link.

The following description provides examples of sidelink DRX and standalone sidelink beam failure detection and recovery, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more BSs 110 and/or UEs 120 in the wireless communication network 100 via one or more interfaces.

According to certain aspects, the UEs 120 may be configured for standalone beam failure recovery as described herein. For example, as shown, the UEs 120a and 120b may include a sidelink beam failure recovery (BFR) module 122a and 122b, respectively, that may be configured for sidelink discontinuous reception (DRX) and standalone sidelink beam failure detection and recovery as described herein, in accordance with aspects of the present disclosure. For example, in some cases, the sidelink BFR module 122a and 122b may be configured to perform the operations illustrated in one or more of FIG. 7 or FIG. 8, as well as other operations disclosed herein for sidelink DRX and standalone sidelink beam failure detection and recovery.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
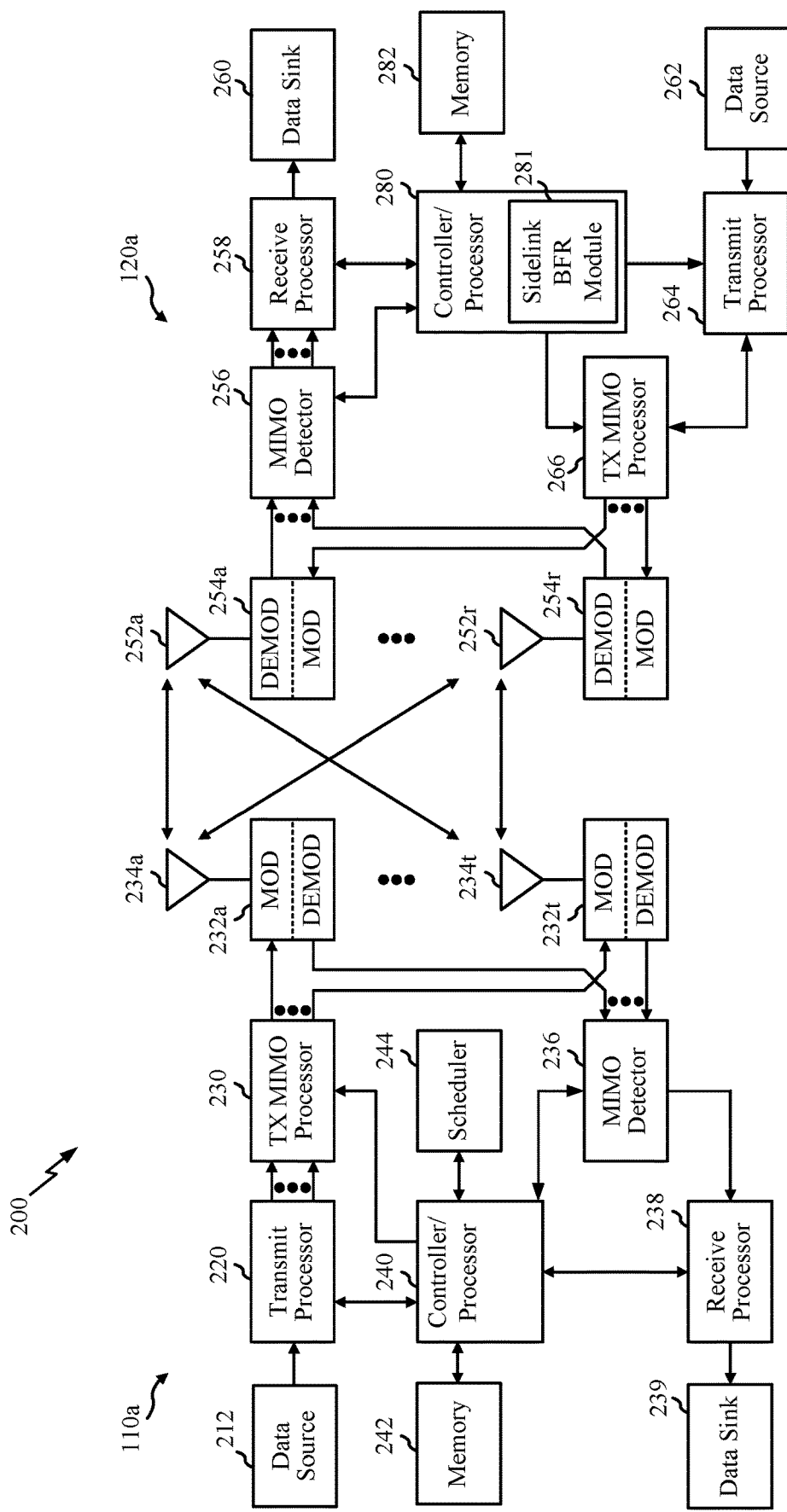
FIG. 2 is a block diagram conceptually illustrating a design of an example a base station (BS) and user equipment (UE), in accordance with certain aspects of the present disclosure.

FIG. 2 illustrates example components of BS 110a and UE 202, which may be used to implement aspects of the present disclosure. UE 202 may comprise UE 120a, 120b, or UE 120c of FIG. 1

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 202, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 202 to a data sink 260, and provide decoded control information to a controller/processor 280.

On the uplink, at UE 202, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 202 may be received by the antennas 234, processed by the demodulators 232, detected by a MIMO detector 236 if applicable, and further processed by a receive processor 238 to obtain decoded data and control information sent by the UE 202. The receive processor 238 may provide the decoded data to a data sink 239 and the decoded control information to the controller/processor 240.

The memories 242 and 282 may store data and program codes for BS 110a and UE 202, respectively. A scheduler 244 may schedule UEs for data transmission on the downlink and/or uplink.

Antennas 252, processors 266, 258, 264, and/or controller/processor 280 of the UE 202 and/or antennas 234, processors 220, 230, 238, and/or controller/processor 240 of the BS 110a may be used to perform the various techniques and methods described herein. For example, shown in FIG. 2, the controller/processor 280 of the UE 202 includes a sidelink beam failure recovery (BFR) module 281 that may be configured for sidelink discontinuous reception (DRX) and standalone sidelink beam failure detection and recovery, according to aspects described herein. For example, in some cases, the sidelink BFR module 281 may be configured to perform the operations illustrated in one or more of FIG. 7 or FIG. 8, as well as other operations described herein for standalone beam failure recovery. Although shown at the controller/processor, other components of the UE 202 and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
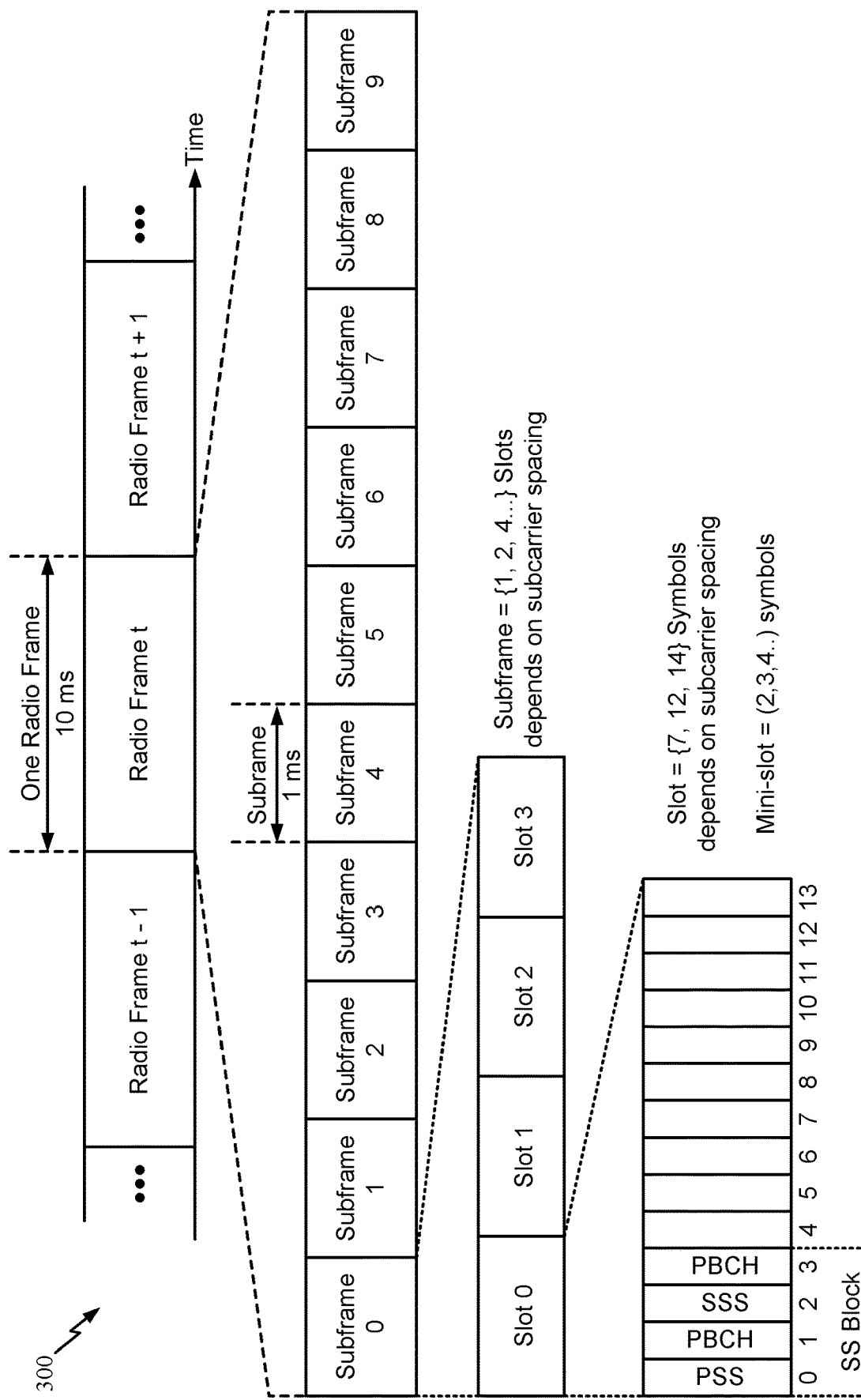
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices, such as UEs, may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4B:
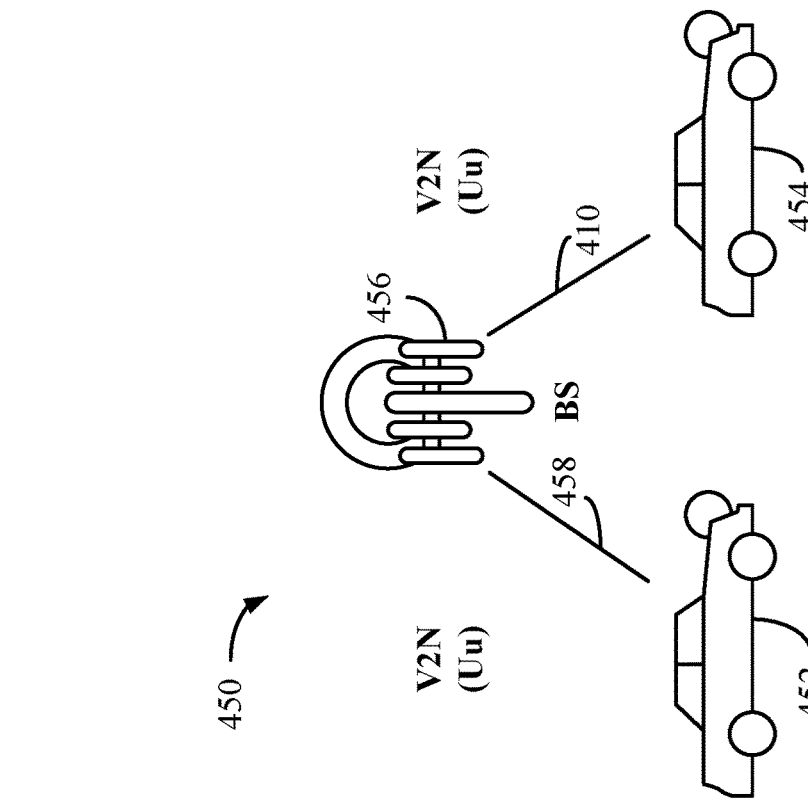
FIG. 4A and FIG. 4B show diagrammatic representations of example vehicle to everything (V2X) systems, in accordance with certain aspects of the present disclosure.
Figure 4A:
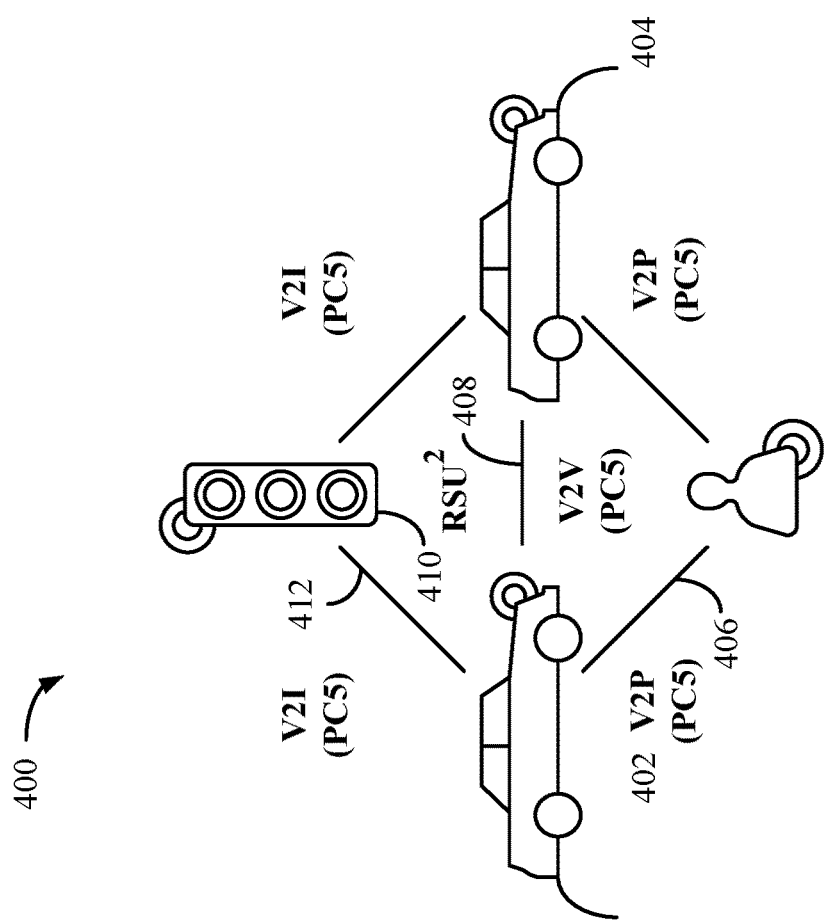

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

As noted above, certain devices may communicate with each other on a sidelink channel. In some cases, such communication may be performed according to one or more resource allocation modes.

Figure 5:
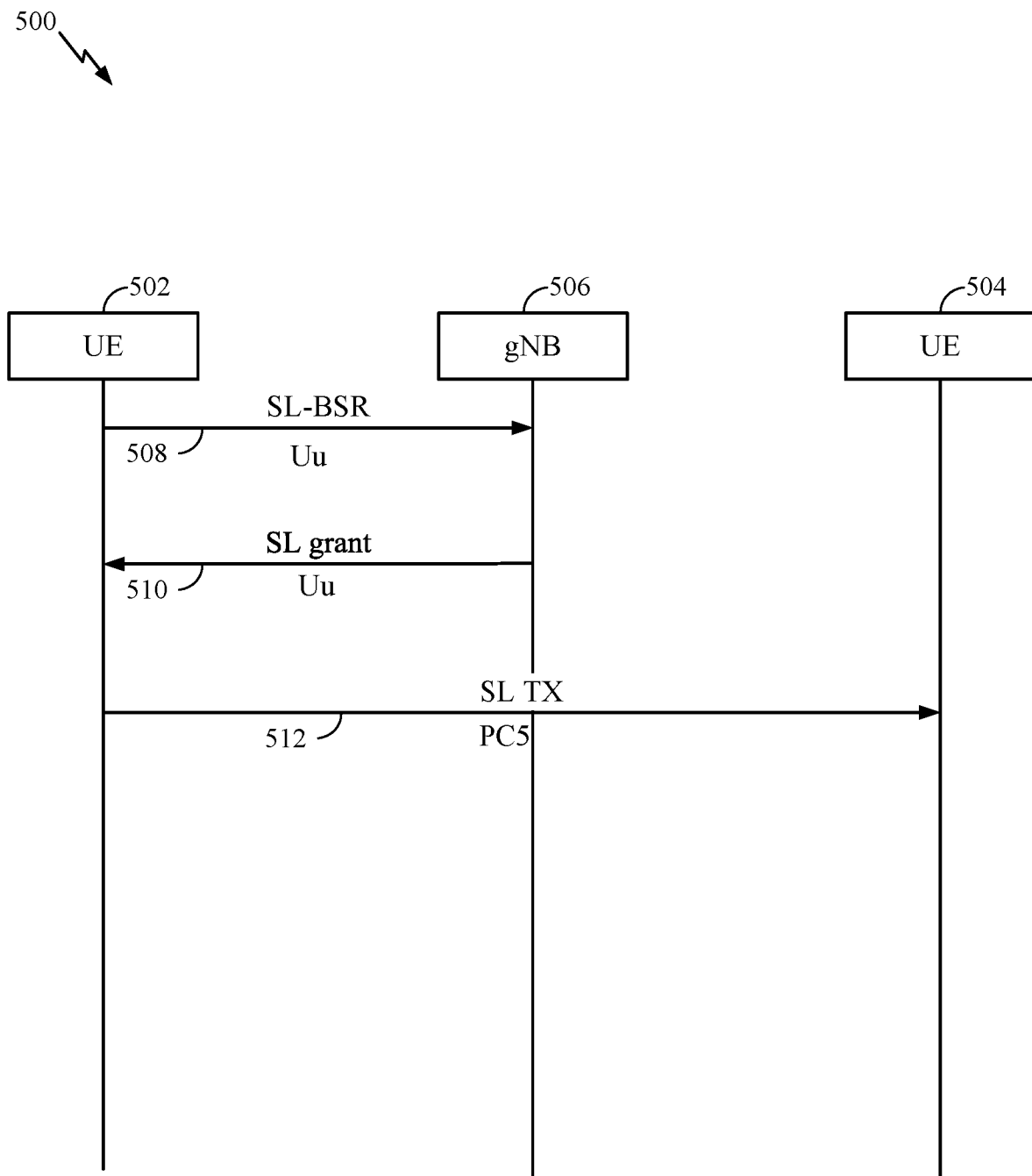
FIG. 5 is a call flow diagram illustrating example resource allocation for sidelink transmission, in accordance with certain aspects of the present disclosure.

For example, in one resource allocation mode (e.g., gNB-assisted sidelink resource allocation Mode 1), a serving gNB allocates sidelink resources for sidelink transmission. As shown in FIG. 5, the UE 502 may send a sidelink buffer status report (SL-BSR) at 508 to the serving gNB 506 (e.g., via Uu). The SL-BSR provides the serving gNB 506 with information about sidelink data volume of logical channel identifiers (LDICs) to each destination ID. The gNB 506 receives the SL-BSR and provides a SL grant, at 510, to the UE 502 allocated resources for sidelink transmission from the transmitting UE 502 to the receiving UE 504. At 512, the UE 502 sends a SL transmission (e.g., via PC5) to the UE 504 using the granted resources.

Figure 6:
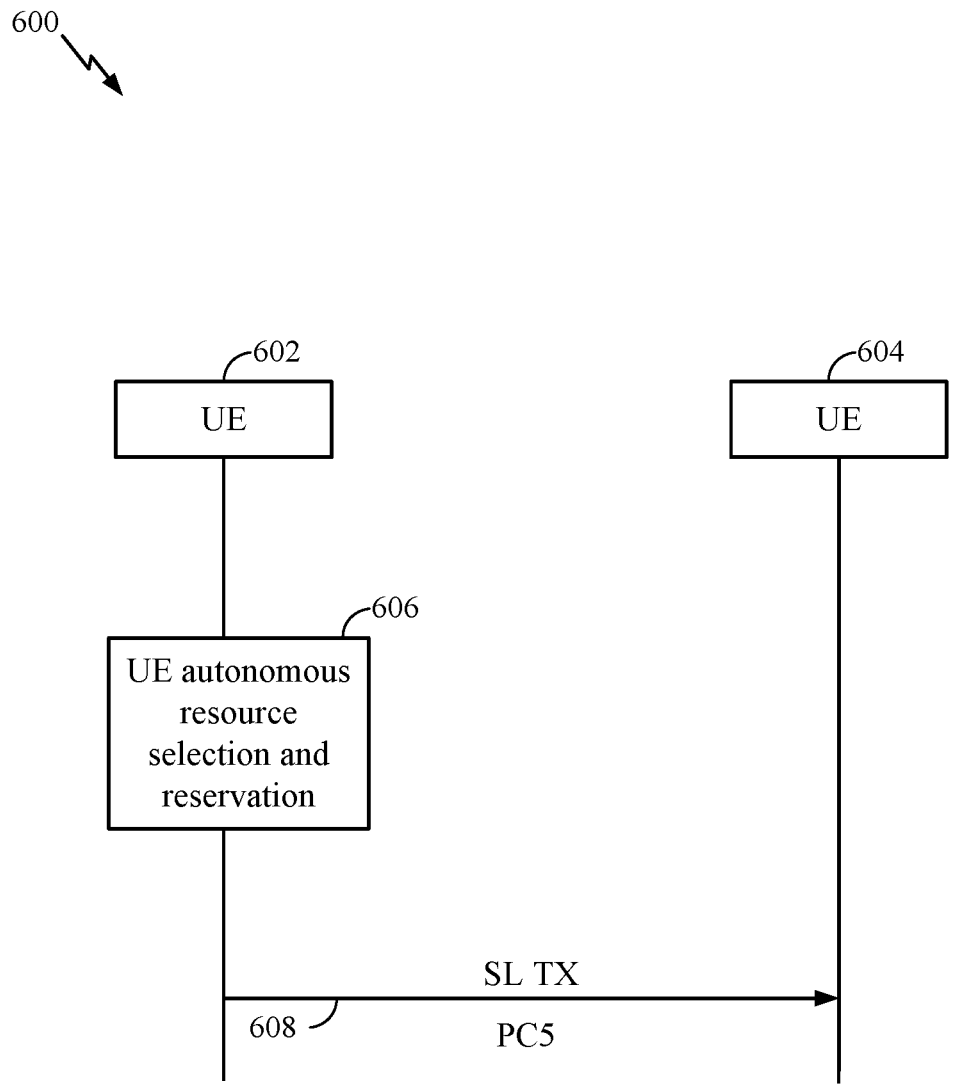
FIG. 6 is a call flow diagram illustrating example autonomous resource selection for sidelink transmission, in accordance with certain aspects of the present disclosure.

In another resource allocation mode (e.g., standalone sidelink resource allocation Mode 2), the UEs may autonomously select sidelink resources (e.g., time and/or frequency resources) without assistance from the gNB. For example, as shown in FIG. 6, at 606, a transmitting UE 602 autonomously selects and reserves resources for sidelink transmission. At 608, the transmitting UE 602 sends a SL transmission to the receiving UE 604 using the autonomously selected resources (e.g., via PC5).

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. Accordingly, a mmWave base station (e.g., BS 110a) may utilize beamforming with a UE (e.g., UE 120a or 120b) to improve path loss and range. To do so, base station and the UE may each include a plurality of antennas, such as antenna elements, antenna panels, and/or antenna arrays to facilitate the beamforming.

In some cases, base station may transmit a beamformed signal to UE in one or more transmit directions. The UE may receive the beamformed signal from the base station in one or more receive directions. The UE may also transmit a beamformed signal to the base station in one or more transmit directions. The base station may receive the beamformed signal from the UE in one or more receive directions. The base station and the UE may then perform beam training to determine the best receive and transmit directions for each of the base station and the UE. Notably, the transmit and receive directions for the base station may or may not be the same. Similarly, the transmit and receive directions for the UE may or may not be the same. Additionally, similar techniques for mmWave beamforming may be used between two UEs for communication on the sidelink.

Example Sidelink DRX and Standalone Sidelink Beam Failure Detection and Recovery As noted above, two or more UEs (e.g., UE 120*a* and UE 120*b*) may communicate with each other via a sidelink connection/channel using a particular resource allocation mode. In some cases, such resource allocation mode may comprise a standalone sidelink resource allocation mode (e.g., Mode 2), in which the UEs may autonomously select sidelink resources (e.g., time and/or frequency resources) for communication without the assistance of a base station, as illustrated in FIG. 6.

In many cases, the UEs may use a millimeter wave (mmWave) frequency when communicating via a sidelink connection. The sidelink connection, when using mmWave, may be composed of one or more directional beams (e.g., transmission and reception beams) at each UE, which may be generated using beamforming. For example, in some cases, the UE 120*a* may transmit information to the UE 120*b* on the sidelink using a first transmission (Tx) beam and the UE 120*b* may receive information from the UE 120*a* using a first reception (Rx) beam. Likewise, the UE 120*b* may transmit information to the UE 120*a* on the sidelink using a second Tx beam and the UE 120*a* may receive the information from the UE 120*b* using a second Rx beam. In some cases, the first Tx beam of the UE 120*a* and the first Rx beam of the UE 120*b* may be known as a beam pair link.

In some cases, each UE may be configured with resources for transmitting beam failure detection reference signals for detecting a beam failure in the beam pair link/sidelink connection. In some cases, the beam failure detection reference signals may comprise sidelink reference signals such as a sidelink channel state information reference signal (CSI-RS) and/or a sidelink synchronization signal block (SSB). A beam failure may occur, for example, when a first UE moves outside an area covered by the previous Tx/Rx beams used for communication on the sidelink with a second UE such that the second UE is not able receive signals from the first UE or vice versa. In this case, for example, the beam failure may be detected, for example, when the first UE transmits a beam failure detection reference signals using known resources but does not receive a response to the beam failure detection reference signals from the second UE. In other cases, the beam failure may be inferred by the first UE when the UE receives connection request from the second UE on a different Tx/Rx beam than that used previously between the first UE and the second UE.

In many cases, each UE may operate according to a discontinuous reception (DRX) mode associated with the sidelink connection. For example, the DRX mode allows a UE to periodically operate in an awake state (e.g., an active mode) in which the UE may transmit or receive signals and to periodically operate in a sleep state (e.g., a sleep mode) in which a modem of the UE remains idle and does not transmit or receive signals, allowing the UE to conserve power when in the sleep state.

When a beam failure is detected on the sidelink connection by either the first UE or the second UE, a sidelink beam failure recovery procedure may be performed to recover connection between the first UE and the second UE. For example, in some cases, the first UE may transmit SSBs using different transmission beams and may receive a random access channel (RACH) message from the second UE in response to the transmitted SSBs. The first UE may respond to the RACH message transmitted by the second UE with a RACH response message to reestablish the sidelink connection.

However, when each UE is operating in a DRX mode, the sleep state of the DRX mode may interference with the resources for transmitting the beam failure detection reference signals. For example, in some cases, the resources for transmitting the beam failure detection reference signals may occur during the sleep state of the DRX mode, rendering the UEs unable to transmit the beam failure detection reference signals and, thus, to detect a beam failure on the sidelink. Accordingly, aspects of the present disclosure provide techniques for addressing these issues with beam failure detection while operating in a DRX mode. In some cases, such techniques may involve configuring a periodicity of the awake state of the DRX mode based on a periodicity of the resources for transmitting the plurality of beam failure detection reference signals.

Figure 7:
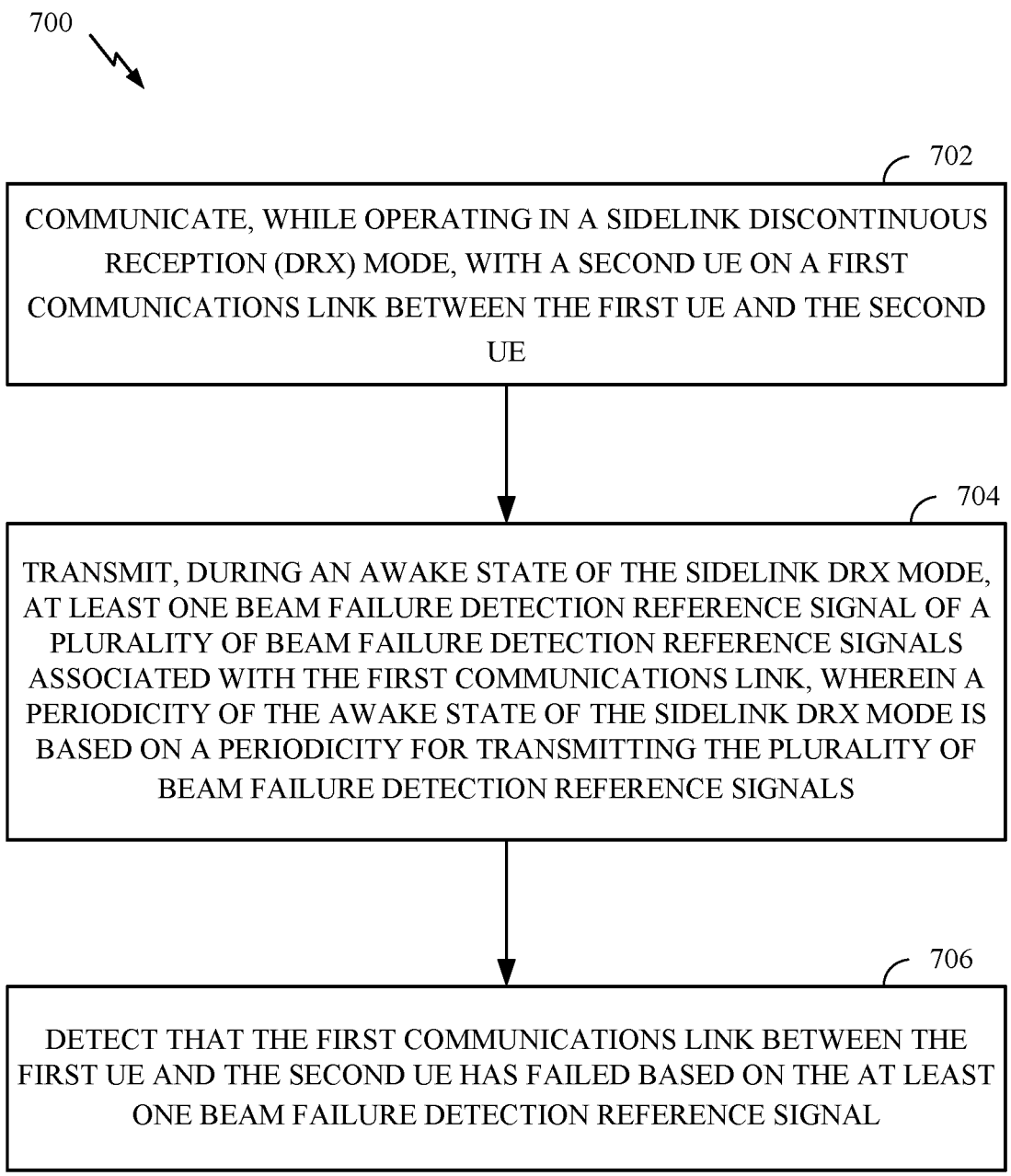
FIG. 7 is a flow diagram illustrating example operations for wireless communication by a first UE, in accordance with certain aspects of the present disclosure.

FIG. 7 is a flow diagram illustrating example operations 700 for wireless communication for sidelink DRX and standalone sidelink beam failure detection and recovery, in accordance with certain aspects of the present disclosure. The operations 700 may be performed, for example, by a first sidelink (SL) device (e.g., the UE 120*a* and/or the UE 120*b* in the wireless communication network 100). The operations 700 may be implemented as software components that are executed and run on one or more processors (e.g., controller/processor 280 of FIG. 2). Further, the transmission and reception of signals by the apparatus in operations 700 may be enabled, for example, by one or more antennas (e.g., antennas 252 of FIG. 2). In certain aspects, the transmission and/or reception of signals by the apparatus may be implemented via a bus interface of one or more processors (e.g., controller/processor 280) obtaining and/or outputting signals.

The operations 700 may begin, at 702, by communicating, while operating in a sidelink discontinuous reception (DRX) mode, with a second UE on a first communications link between the first UE and the second UE.

At 704, the SL device transmits, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals.

At 706, the SL device detects that the first communications link between the first UE and the second UE has failed based on the at least one beam failure detection reference signal.

As noted above, a first UE (e.g., UE 120*a*) may communicate, while operating in a sidelink DRX mode, with a second UE on a first communications link between the first UE and the second UE. In some cases, the first communications link may comprise a sidelink between the first UE and the second UE. In some cases, communication on the sidelink may be performed according to a resource allocation mode in which the UEs may autonomously select sidelink resources (e.g., time and/or frequency resources) for communication without the assistance of a base station, such as a standalone sidelink resource allocation Mode 2. Additionally, as noted above, in some cases, communicating using the first communications link (e.g., sidelink) may involve using one or more beamformed directional beams, such as a directional transmission beam and a direction reception beam. For example, in some cases, the first UE may transmit information to the second UE on the first communications link using a first transmission beam and the second UE may receive the information using a first receive beam. In some cases, the first transmission beam and the first reception beam may be known as a beam pair link.

In some cases, the first UE and the second UE may be configured with resources for transmitting beam failure detection reference signals, such as sidelink CSI-RSs and/or sidelink SSBs. In such cases, due to potential conflict between the resources for transmitting the beam failure detection reference signals and a sleep state of the sidelink DRX mode, a periodicity associated with the sidelink DRX mode may be based on the resources for transmitting the beam failure detection reference signals. For example, in some cases, a periodicity of an awake state of the sidelink DRX mode may be based on a periodicity for transmitting the plurality of beam failure detection reference signals. In other words, for example, the resources for transmitting the beam failure detection reference signals may coincide with the awake state of the sidelink DRX mode, ensuring that the UE is awake and able to transmit/receive the beam failure detection reference signals during the configured resources.

Additionally, in some cases, if periodicity of the resources for transmitting and receiving the plurality of beam failure detection reference signals is adjusted, the periodicity of the awake state of the DRX mode may be adjusted. For example, the periodicity of the awake state of the DRX mode may be increased if there is an increase in the periodicity of the resources for transmitting and receiving the plurality of beam failure detection reference signals. Similarly, the periodicity of the awake state of the DRX mode may be decreased if the periodicity of the resource for transmitting and receiving the plurality of beam failure detection reference signals is decreased.

Accordingly, during an awake state of the sidelink DRX mode, the first UE may transmit at least one beam failure detection reference signal of a plurality of beam failure detection reference signals associated with the first communications link, for example, using the configured resources for transmitting the beam failure detection reference signals.

Thereafter, in some cases, the first UE may detect that the first communications link between the first UE and the second UE has failed based on the at least one beam failure detection reference signal. In some cases, the first UE may detect that the first communications link between the first UE and the second UE has failed based on the first UE not receiving, within a threshold period of time, a response message from the second UE, responding to the at least one beam failure detection reference signal. In some cases, the response message may comprise an acknowledgement message.

In other cases, the first UE may receive a sidelink random access channel (RACH) message from the second UE in response to the at least one beam failure detection reference signal (e.g., an SSB) and may detect that the first communications link between the first UE and the second UE has failed based on the sidelink RACH message received from the second UE. For example, as noted above, the first UE and second UE may communicate on the sidelink using a first transmission beam (e.g., at the first UE) and a first reception beam (e.g., as the second UE). Accordingly, if the RACH message received from the second UE includes an indication of a transmission beam different from the first transmission beam, the first UE may infer that the first communications link failed.

According to aspects, when the UE receives the RACH message from the second UE, the first UE may then transmit a sidelink RACH response message to the second UE, responding to the sidelink RACH message received from the UE and reestablish the first communications link between the first UE and the second UE based, at least in part, on the sidelink RACH response message.

In some cases, in response to detecting that the first communications link between the first UE and the second UE has failed (e.g., in some cases, based on not receiving an acknowledgement to a beam failure detection reference signal), the first UE may remain in the awake state of the sidelink DRX mode. During the awake state of the sidelink DRX mode, the first UE may perform a sidelink beam failure recovery procedure to reestablish the first communications link between the first UE and the second UE. For example, in some cases, performing the sidelink beam failure recovery procedure may comprise transmitting one or more sidelink SSBs. In some cases, the first UE may transmit the one or more sidelink SSBs using multiple different transmission beams.

Thereafter, the first UE may receive, based on the one or more sidelink SSBs, a sidelink random access channel (RACH) message from the second UE. In some cases, the sidelink RACH message may include an indication of at least one transmission beam of the multiple different transmission beams used to transmit the one or more sidelink SSBs. Accordingly, the first UE may then transmit a sidelink RACH response message to the second UE, responding to the sidelink RACH message received from the second UE and reestablish the first communications link between the first UE and the second UE based, at least in part, on the sidelink RACH response message. In some cases, the first communications link may be reestablished using the transmission beam indicated in the RACH message.

Additionally, while the first UE and second UE may communicate using a first communications link (e.g., sidelink) according to the standalone resource allocation mode in which the UEs autonomously select sidelink resources for communication without the assistance of a base station, the first UE may also communicate with the base station using a second communications link between the UE and a base station, such as an access link (e.g., Uu communications link). In some cases, the UE may operate in a second DRX mode associated with the second communications link (e.g., the access communications link), such as an access DRX mode. In some cases, the access DRX mode may be synchronized with the sidelink DRX mode. Accordingly, during the sidelink beam failure recovery procedure, the first UE may remain in an awake state of the access DRX mode. In this case, since the first UE is in the awake state of the access DRX mode, the first UE may desire to take advantage of the awake state and receive control/data signals from the base station during the awake state of the access DRX mode on the second communications link. However, the base station may not know that the first UE is in the awake state of the access DRX mode since the first UE autonomously handles the sidelink beam failure recovery procedure.

Accordingly, if the first UE desires to communicate (e.g., transmit or receive) signaling (e.g. control or data signaling) with the base station, the first UE may further transmit signaling to the base station indicating that the first UE is in the awake state of the access DRX mode. As noted, the awake state of the access DRX mode may occur at a period of time during which the first UE is scheduled to be in a sleep state of the access DRX mode. However, the first UE may, nevertheless, be in the awake state of the access DRX mode during the period of time which the first UE is scheduled to be in the sleep state of the access DRX mode based on the sidelink beam failure recovery procedure. Accordingly, by transmitting signaling to the base station indicating that the first UE is in the awake state of the access DRX mode, the first UE may receive at least one data (or control) transmission from the BS on the second communications link in response to the signaling indicating that the first UE is in the awake state of the access DRX mode.

In some cases, the first UE may transmit the signaling to the base station indicating that the first UE is in the awake state of the access DRX mode after the first communications link between the first UE and the second UE has been reestablished. In other cases, the first UE may transmit the signaling to the base station indicating that the first UE is in the awake state of the access DRX mode before the first communications link between the first UE and the second UE has been reestablished.

Aspects of the present disclosure will now describe techniques performed by the second UE. The techniques described below by the second UE may be complimentary to the techniques described above with respect to the first UE.

Figure 8:
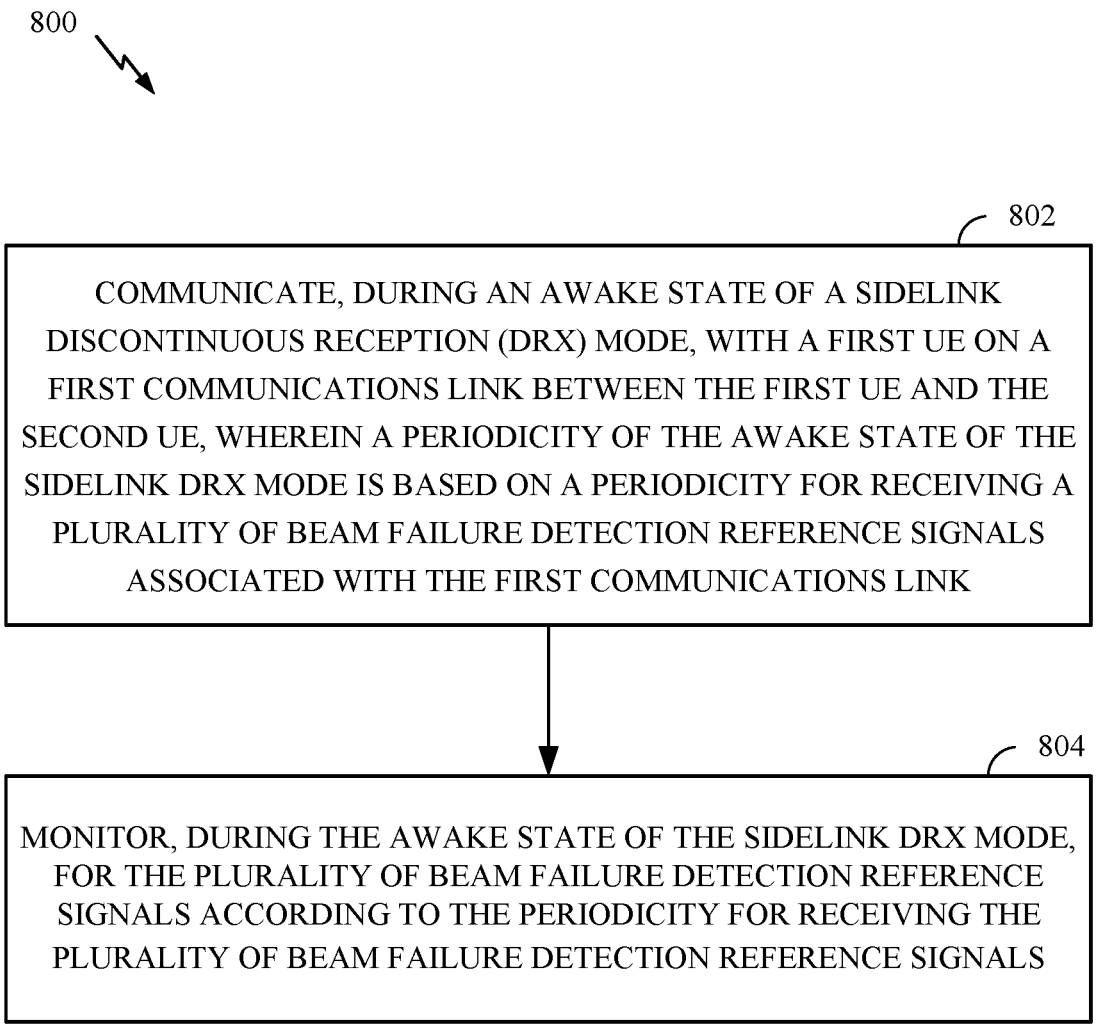
FIG. 8 is a flow diagram illustrating example operations for wireless communication by a second UE, in accordance with certain aspects of the present disclosure.

For example, FIG. 8 is a flow diagram illustrating example operations 800 for wireless communication for sidelink DRX and standalone sidelink beam failure detection and recovery, in accordance with certain aspects of the present disclosure. The operations 800 may be performed, for example, by a second SL device (e.g., the UE 120a and/or the UE 120b in the wireless communication network 100). As noted, operations 800 may be considered complimentary to operations 700 and may be implemented as software components that are executed and run on one or more processors (e.g., controller/processor 280 of FIG. 2). Further, the transmission and reception of signals by the apparatus in operations 800 may be enabled, for example, by one or more antennas (e.g., antennas 252 of FIG. 2). In certain aspects, the transmission and/or reception of signals by the apparatus may be implemented via a bus interface of one or more processors (e.g., controller/processor 280) obtaining and/or outputting signals.

The operations 800 may begin, at 802, by communicating, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link.

At 804, the second SL device monitors, during the awake state of the sidelink DRX mode, for the plurality of beam failure detection reference signals according to the periodicity for receiving the plurality of beam failure detection reference signals.

According to aspects, the second UE may monitor for the at least one beam failure detection reference signal in resources configured for transmitting beam failure detection reference signals, which may coincide with the awake state of the sidelink DRX mode, as described above. For example, in some cases, the second UE may receive, from the first UE, at least one beam failure detection reference signal of the plurality of beam failure detection reference signals based on the monitoring. According to aspects, the at least one beam failure detection reference signal may be received in the awake state of the sidelink DRX mode in resources configured for transmitting beam failure detection reference signals. Thereafter, the second UE may transmit a response message to the first UE, responding to the at least one beam failure detection reference signal. In this case, since the second UE was able to receive the at least one beam failure detection signal from the first UE, the first communications link has not failed.

In other cases, the second UE may detect that the first communications link between the first UE and the second UE has failed based on the monitoring (e.g., based on the second UE not receiving the at least one beam failure detection signal from the first UE) and may perform a beam failure recovery procedure to reestablish the first communications link between the first UE and the second UE. As with the first UE, the second UE may remain in an awake state of the sidelink DRX mode during the beam failure recovery procedure.

In some cases, performing the beam failure recovery procedure may include receiving one or more sidelink synchronization signal blocks (SSBs) from the first UE based on the detection that the first communications link between the first UE and the second UE has failed. Thereafter, the second UE may transmit a sidelink random access channel (RACH) message to the first UE in response to the received one or more sidelink SSBs. In some cases, as noted above, the RACH message may include an indication of a transmission beam used by the first UE to transmit the one or more sidelink SSBs. Thereafter, the second UE may receive a sidelink RACH response message from the first UE based on the sidelink RACH message transmitted to the first UE and may reestablish the first communications link between the first UE and the second UE based on the sidelink RACH response message. In some cases, the first communications link may be reestablished using the transmission beam indicated in the RACH message.

Additionally, as with the first UE, since during the beam failure recovery procedure the second UE remains in an awake state of an access DRX mode associated with a second communications link between the second UE and a BS, the second UE may take advantage of the awake state of the access DRX mode by communicating with the BS during the awake state of the access DRX mode. For example, in some cases, the second UE may transmit signaling to the BS indicating that the second UE is in the awake state of the access DRX mode. As noted, the awake state of the access DRX mode may occur at a period of time during which the second UE is scheduled to be in a sleep state of the access DRX mode. However, the second UE may, nevertheless, be in the awake state of the access DRX mode during the period of time which the second UE is scheduled to be in the sleep state of the access DRX mode based on the sidelink beam failure recovery procedure. Accordingly, by transmitting signaling to the base station indicating that the second UE is in the awake state of the access DRX mode, the second UE may receive at least one data (or control) transmission from the BS on the second communications link in response to the signaling indicating that the first UE is in the access awake state.

In some cases, the second UE may transmit the signaling to the base station indicating that the second UE is in the awake state of the access DRX mode after the first communications link between the first UE and the second UE has been reestablished. In other cases, the second UE may transmit the signaling to the base station indicating that the second UE is in the awake state of the access DRX mode before the first communications link between the first UE and the second UE has been reestablished.

Example Wireless Communication Devices

Figure 9:
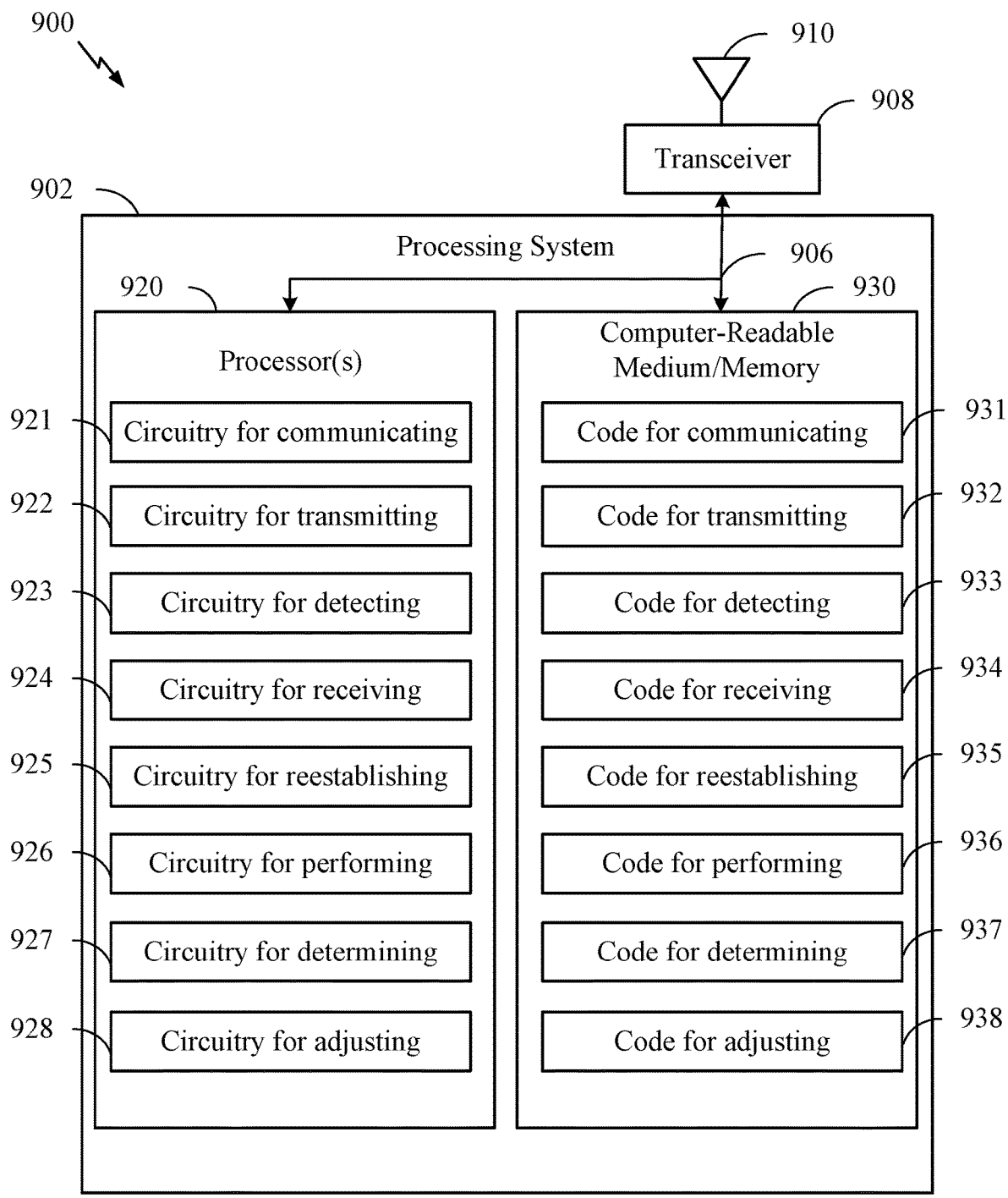
FIGS. 9-10 depict aspects of example communications devices, in accordance with certain aspects of the present disclosure.

FIG. 9 depicts an example communications device 900 that includes various components operable, configured, or adapted to perform operations for the techniques disclosed herein, such as the operations depicted and described with respect to FIG. 7. In some examples, communication device 900 may be a user equipment 120a, 202, 452, 502 as described, for example with respect to FIGS. 1, 2, 4, and 5.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 7, or other operations for performing the various techniques discussed herein for sidelink DRX and standalone sidelink beam failure detection and recovery.

In the depicted example, computer-readable medium/memory 930 stores code 931 for communicating, code 932 for transmitting, code 933 for detecting, code 934 for receiving, code 935 for reestablishing, code 936 for performing, code 937 for determining, and code 938 for adjusting.

In the depicted example, the one or more processors 920 include circuitry configured to implement the code stored in the computer-readable medium/memory 930, including circuitry 921 for communicating, circuitry 922 for transmitting, circuitry 923 for detecting, circuitry 924 for receiving, circuitry 925 for reestablishing, circuitry 926 for performing, circuitry 927 for determining, and circuitry 928 for adjusting.

Various components of communications device 900 may provide means for performing the methods described herein, including with respect to FIG. 7.

In some examples, means for transmitting or sending (or means for outputting for transmission), as well as means for communicating, may include the transceivers 254 and/or antenna(s) 252 of the user equipment 104 illustrated in FIG. 2 and/or transceiver 908 and antenna 910 of the communication device 900 in FIG. 9.

In some examples, means for receiving (or means for obtaining), as well as means for communicating, may include the transceivers 254 and/or antenna(s) 252 of the user equipment 202 illustrated in FIG. 2 and/or transceiver 908 and antenna 910 of the communication device 900 in FIG. 9.

In some examples, means for detecting, means for determining, means for reestablishing, means for performing, and means for adjusting may include various processing system components, such as: the one or more processors 920 in FIG. 9, or aspects of the user equipment 202 depicted in FIG. 2, including receive processor 258, transmit processor 264, TX MIMO processor 266, and/or controller/processor 280 (including sidelink BFR module 281).

Figure 10:
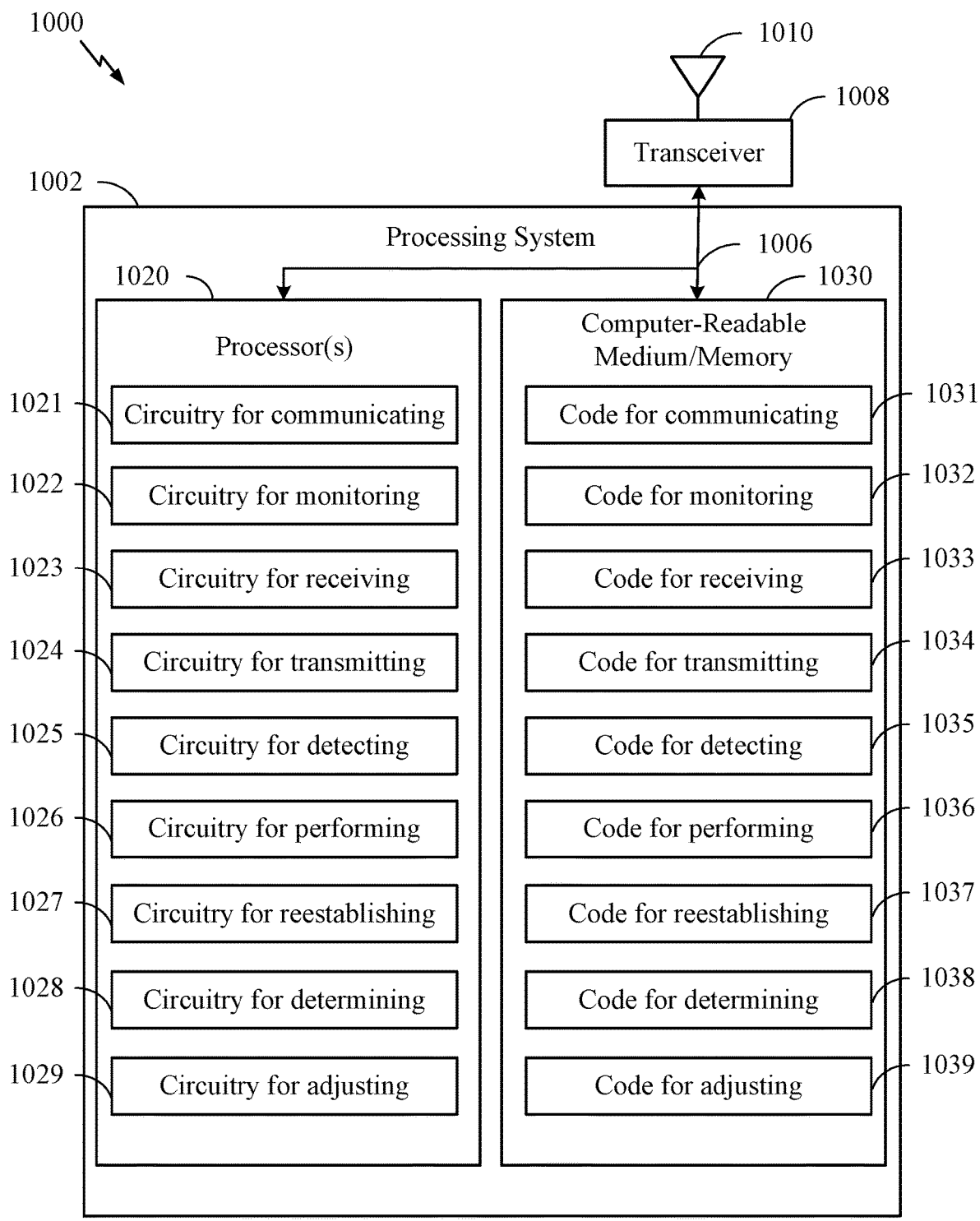

Notably, FIG. 9 is just one example, and many other examples and configurations of communication device 900 are possible FIG. 10 depicts an example communications device 1000 that includes various components operable, configured, or adapted to perform operations for the techniques disclosed herein, such as the operations depicted and described with respect to FIG. 8. In some examples, communication device 1000 may be a user equipment 120a, 202, 454, 504 as described, for example with respect to FIGS. 1, 2, 4, and 5.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIG. 8, or other operations for performing the various techniques discussed herein for sidelink DRX and standalone sidelink beam failure detection and recovery.

In the depicted example, computer-readable medium/memory 1030 stores code 1031 for communicating, code 1032 for monitoring, code 1033 for receiving, code 1034 for transmitting, code 1035 for detecting, code 1036 for performing, code 1037 for reestablishing, code 1038 for determining, and code 1039 for adjusting.

In the depicted example, the one or more processors 1020 include circuitry configured to implement the code stored in the computer-readable medium/memory 1030, including circuitry 1021 for communicating, circuitry 1022 for monitoring, circuitry 1023 for receiving, circuitry 1024 for transmitting, circuitry 1025 for detecting, circuitry 1026 for performing, circuitry 1027 for reestablishing, circuitry 1028 for determining, and circuitry 1029 for adjusting.

Various components of communications device 1000 may provide means for performing the methods described herein, including with respect to FIG. 8.

In some examples, means for transmitting, means for communicating, or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining), as well as means for communicating, may include the transceivers 254 and/or antenna(s) 252 of the user equipment 104 illustrated in FIG. 2 and/or transceiver 1008 and antenna 1010 of the communication device 1000 in FIG. 10.

In some examples, means for performing, means for reestablishing, and means for monitoring, means for detecting, means for adjusting, and means for determining may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including sidelink BFR module 281).

Notably, FIG. 10 is just one example, and many other examples and configurations of communication device 1000 are possible.

Example Clauses

Implementation examples are described in the following numbered clauses:

Clause 1: A method for wireless communication performed by a first user equipment (UE), comprising: communicating, while operating in a sidelink discontinuous reception (DRX) mode, with a second UE on a first communications link between the first UE and the second UE; transmitting, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and detecting that the first communications link between the first UE and the second UE has failed based on the at least one beam failure detection reference signal.

Clause 2: The method of Clause 1, wherein the plurality of beam failure detection reference signals comprise at least one of: sidelink channel state information reference signals (CSI-RSs); or sidelink synchronization signal blocks (SSBs).

Clause 3: The method of any one of Clauses 1-2, wherein detecting that the first communications link between the first UE and the second UE has failed based on the at least one beam failure detection reference signal comprises: not receiving, within a threshold period of time, a response message from the second UE, responding to the at least one beam failure detection reference signal; and detecting that the first communications link between the first UE and the second UE has failed is further based on not receiving the response message from the second UE within the threshold period of time.

Clause 4: The method of any one of Clauses 1-2, wherein detecting that the first communications link between the first UE and the second UE has failed based on the at least one beam failure detection reference signal comprises: receiving a sidelink random access channel (RACH) message from the second UE in response to the at least one beam failure detection reference signal; and detecting that the first communications link between the first UE and the second UE has failed is further based on the sidelink RACH message received from the second UE.

Clause 5: The method of Clause 4, wherein the sidelink RACH message indicates a transmission beam different from that associated with the first communications link.

Clause 6: The method of any one of Clauses 4-5, wherein the at one beam failure detection reference signal comprises at least one sidelink synchronization signal block (SSB).

Clause 7: The method of claim any one of Clauses 4-5, further comprising: transmitting a sidelink RACH response message to the second UE, responding to the sidelink RACH message received from the UE; and reestablishing the first communications link between the first UE and the second UE based, at least in part, on the sidelink RACH response message.

Clause 8: The method of any one of Clauses 1-7, further comprising remaining in the awake state of the sidelink DRX mode in response to detecting that the first communications link between the first UE and the second UE has failed.

Clause 9: The method of Clause 8, further comprising performing, during the awake state of the sidelink DRX mode, a sidelink beam failure recovery procedure to reestablish the first communications link between the first UE and the second UE.

Clause 10: The method of Clause 9, wherein performing the sidelink beam failure recovery procedure comprises: transmitting one or more sidelink synchronization signal blocks (SSBs); receiving, based on the one or more sidelink SSBs, a sidelink random access channel (RACH) message from the second UE; transmitting a sidelink RACH response message to the second UE, responding to the sidelink RACH message received from the second UE; and reestablishing the first communications link between the first UE and the second UE based, at least in part, on the sidelink RACH response message.

Clause 11: The method of Clause 10, wherein: transmitting the one or more sidelink SSBs comprises transmitting the one or more sidelink SSBs using multiple different transmission beams; and the sidelink RACH message includes an indication of at least one transmission beam of the multiple different transmission beams.

Clause 12: The method of any one of Clauses 10-11, further comprising: communicating with a base station (BS) on a second communications link between the first UE and the BS; transmitting signaling to the BS indicating that the first UE is in an awake state of an access DRX mode associated with the second communications link; and receiving at least one data transmission from the BS in response to the signaling indicating that the first UE is in the awake state of the access DRX mode associated with the second communications link.

Clause 13: The method of Clause 12, wherein: the awake state of the access DRX mode occurs at a period of time during which the first UE is scheduled to be in a sleep state of the access DRX mode; and the UE is in the awake state of the access DRX mode during the period of time which the first UE is scheduled to be in the sleep state of the access DRX mode based on the sidelink beam failure recovery procedure.

Clause 14: The method of any one of Clauses 12-13, wherein transmitting the signaling to the BS indicating that the first UE is in the awake state of the access DRX mode comprises transmitting the signaling to the base station indicating that the first UE is in the awake state of the access DRX mode after the first communications link between the first UE and the second UE has been reestablished.

Clause 15: The method of any one of Clauses 1-14, wherein the first communications link comprises a sidelink between the first UE and the second UE.

Clause 16: The method of any one of Clauses 1-15, further comprising: determining a change in the periodicity for transmitting the plurality of beam failure detection reference signals; and adjusting at least one of the periodicity of the awake state of the sidelink DRX mode or a periodicity of a sleep state of the sidelink DRX mode based on the determined change in the periodicity for transmitting the plurality of beam failure detection reference signals.

Clause 17: The method of Clause 16, wherein: the determined change increases the periodicity for transmitting the plurality of beam failure detection reference signals; and adjusting at least one of the periodicity of the awake state of the sidelink DRX mode or the periodicity of the sleep state of the sidelink DRX mode comprises at least one of increasing the periodicity of the awake state of the sidelink DRX mode or increasing the periodicity of the sleep state of the sidelink DRX mode.

Clause 18: The method of Clause 16, wherein: the determined change decreases the periodicity for transmitting the plurality of beam failure detection reference signals; and adjusting at least one of the periodicity of the awake state of the sidelink DRX mode or the periodicity of the sleep state of the sidelink DRX mode comprises at least one of decreasing the periodicity of the awake state of the sidelink DRX mode or decreasing the periodicity of the sleep state of the sidelink DRX mode.

Clause 19: A method for wireless communication performed by a second user equipment (UE), comprising: communicating, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link; and monitoring, during the awake state of the sidelink DRX mode, for the plurality of beam failure detection reference signals according to the periodicity for receiving the plurality of beam failure detection reference signals.

Clause 20: The method of Clause 19, further comprising: receiving, from the first UE, at least one beam failure detection reference signal of the plurality of beam failure detection reference signals based on the monitoring; and transmitting a response message to the first UE, responding to the at least one beam failure detection reference signal.

Clause 21: The method of any one of Clauses 19-20, further comprising: detecting that the first communications link between the first UE and the second UE has failed based on the monitoring; and performing a sidelink beam failure recovery procedure to reestablish the first communications link between the first UE and the second UE.

Clause 22: The method of Clause 21, wherein performing the sidelink beam failure recovery procedure comprises remaining in the awake state of the sidelink DRX mode.

Clause 23: The method of Clause 22, wherein performing the sidelink beam failure recovery procedure further comprises: receiving one or more sidelink synchronization signal blocks (SSBs) from the first UE based on the detection that the first communications link between the first UE and the second UE has failed; and transmitting a sidelink random access channel (RACH) message to the first UE in response to the received one or more sidelink SSBs.

Clause 24: The method of Clause 23, wherein performing the sidelink beam failure recovery procedure further comprises: receiving a sidelink RACH response message from the first UE based on the sidelink RACH message transmitted to the first UE; and reestablishing the first communications link between the first UE and the second UE based on the sidelink RACH response message.

Clause 25: The method of Clause 24, further comprising: communicating with a base station (BS) on a second communications link between the second UE and the BS; transmitting signaling to the BS indicating that the second UE is in an awake state of an access DRX mode associated with the second communications link; and receiving at least one data transmission from the BS in response to the signaling indicating that the second UE is in the awake state of the access DRX mode associated with the second communications link.

Clause 26: The method of Clause 25, wherein: the awake state of the access DRX mode occurs at a period of time during which the second UE is scheduled to be in a sleep state of the access DRX mode; and the second UE is in the awake state of the access DRX mode during the period of time which the second UE is scheduled to be in the sleep state of the access DRX mode based on the sidelink beam failure recovery procedure.

Clause 27: The method of any one of Clauses 25-26, wherein transmitting the signaling to the BS indicating that the second UE is in the awake state of the access DRX mode comprises transmitting the signaling to the BS indicating that the second UE is in the awake state of the access DRX mode after the first communications link between the first UE and the second UE has been reestablished.

Clause 28: The method of any one of Clauses 19-27, wherein the first communications link comprises a sidelink between the first UE and the second UE.

Clause 29: The method of any one of Clauses 19-28, further comprising: determining a change in the periodicity for transmitting the plurality of beam failure detection reference signals; and adjusting at least one of the periodicity of the awake state of the sidelink DRX mode or a periodicity of a sleep state of the sidelink DRX mode based on the determined change in the periodicity for transmitting the plurality of beam failure detection reference signals.

Clause 30: The method of Clause 29, wherein: the determined change increases the periodicity for transmitting the plurality of beam failure detection reference signals; and adjusting at least one of the periodicity of the awake state of the sidelink DRX mode or the periodicity of the sleep state of the sidelink DRX mode comprises at least one of increasing the periodicity of the awake state of the sidelink DRX mode or increasing the periodicity of the sleep state of the sidelink DRX mode.

Clause 31: The method of Clause 29, wherein: the determined change decreases the periodicity for transmitting the plurality of beam failure detection reference signals; and adjusting at least one of the periodicity of the awake state of the sidelink DRX mode or the periodicity of the sleep state of the sidelink DRX mode comprises at least one of decreasing the periodicity of the awake state of the sidelink DRX mode or decreasing the periodicity of the sleep state of the sidelink DRX mode.

Clause 32: An apparatus for wireless communication, comprising: a memory comprising executable instructions; and one or more processors configured to execute the executable instructions and cause the apparatus to perform a method in accordance with any one of Clauses 1-31.

Clause 33: An apparatus for wireless communication, comprising means for performing a method in accordance with any one of Clauses 1-31.

Clause 34: A non-transitory computer-readable medium for wireless communication comprising executable instructions that, when executed by one or more processors of an apparatus, cause the apparatus to perform a method in accordance with any one of Clauses 1-31.

Clause 35: A computer program product for wireless communication embodied on a computer-readable storage medium comprising code for performing a method in accordance with any one of Clauses 1-31.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8 as well as other operations described herein for sidelink DRX and standalone sidelink beam failure detection and recovery.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication performed by a first user equipment (UE), comprising:
communicating, while operating in a sidelink discontinuous reception (DRX) mode, with a second UE on a first communications link between the first UE and the second UE, wherein the first communications link comprises a sidelink between the first UE and the second UE;
transmitting, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and
detecting that the first communications link between the first UE and the second UE has failed based on the at least one beam failure detection reference signal, wherein detecting that the first communications link has failed is further based on not receiving, within a threshold period of time, a response message from the second UE responding to the at least one beam failure detection reference signal.

2. The method of claim 1, further comprising:
remaining in the awake state of the sidelink DRX mode in response to detecting that the first communications link between the first UE and the second UE has failed; and
performing, during the awake state of the sidelink DRX mode, a sidelink beam failure recovery procedure to reestablish the first communications link between the first UE and the second UE.

3. The method of claim 2, wherein performing the sidelink beam failure recovery procedure comprises:
transmitting one or more sidelink synchronization signal blocks (SSBs);
receiving, based on the one or more sidelink SSBs, a sidelink random access channel (RACH) message from the second UE;
transmitting a sidelink RACH response message to the second UE, responding to the sidelink RACH message received from the second UE; and
reestablishing the first communications link between the first UE and the second UE based, at least in part, on the sidelink RACH response message.

4. The method of claim 3, wherein:
transmitting the one or more sidelink SSBs comprises transmitting the one or more sidelink SSBs using multiple different transmission beams; and
the sidelink RACH message includes an indication of at least one transmission beam of the multiple different transmission beams.

5. The method of claim 3, further comprising:
communicating with a base station (BS) on a second communications link between the first UE and the BS;
transmitting signaling to the BS indicating that the first UE is in an awake state of an access DRX mode associated with the second communications link; and
receiving at least one data transmission from the BS in response to the signaling indicating that the first UE is in the awake state of the access DRX mode associated with the second communications link.

6. The method of claim 5, wherein:
the awake state of the access DRX mode occurs at a period of time during which the first UE is scheduled to be in a sleep state of the access DRX mode; and
the UE is in the awake state of the access DRX mode during the period of time which the first UE is scheduled to be in the sleep state of the access DRX mode based on the sidelink beam failure recovery procedure.

7. The method of claim 5, wherein transmitting the signaling to the BS indicating that the first UE is in the awake state of the access DRX mode comprises transmitting the signaling to the base station indicating that the first UE is in the awake state of the access DRX mode after the first communications link between the first UE and the second UE has been reestablished.

8. The method of claim 1, wherein the plurality of beam failure detection reference signals comprise at least one of:
sidelink channel state information reference signals (CSI-RSs); or
sidelink synchronization signal blocks (SSBs).

9. The method of claim 1, further comprising:
determining a change in the periodicity for transmitting the plurality of beam failure detection reference signals; and
adjusting at least one of the periodicity of the awake state of the sidelink DRX mode or a periodicity of a sleep state of the sidelink DRX mode based on the determined change in the periodicity for transmitting the plurality of beam failure detection reference signals.

10. The method of claim 9, wherein:
the determined change increases the periodicity for transmitting the plurality of beam failure detection reference signals; and
adjusting at least one of the periodicity of the awake state of the sidelink DRX mode or the periodicity of the sleep state of the sidelink DRX mode comprises at least one of increasing the periodicity of the awake state of the sidelink DRX mode or increasing the periodicity of the sleep state of the sidelink DRX mode.

11. The method of claim 9, wherein:
the determined change decreases the periodicity for transmitting the plurality of beam failure detection reference signals; and
adjusting at least one of the periodicity of the awake state of the sidelink DRX mode or the periodicity of the sleep state of the sidelink DRX mode comprises at least one of decreasing the periodicity of the awake state of the sidelink DRX mode or decreasing the periodicity of the sleep state of the sidelink DRX mode.

12. A method for wireless communication performed by a first user equipment (UE), comprising:
communicating, while operating in a sidelink discontinuous reception (DRX) mode, with a second UE on a first communications link between the first UE and the second UE, wherein the first communications link comprises a sidelink between the first UE and the second UE;
transmitting, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and
detecting that the first communications link between the first UE and the second UE has failed based on the at least one beam failure detection reference signal, wherein detecting that the first communications link has failed is further based on
a sidelink random access channel (RACH) message received from the second UE in response to the at least one beam failure detection reference signal.

13. The method of claim 12, wherein the sidelink RACH message indicates a transmission beam different from that associated with the first communications link.

14. The method of claim 12, wherein the at one beam failure detection reference signal comprises at least one sidelink synchronization signal block (SSB).

15. The method of claim 12, further comprising:
transmitting a sidelink RACH response message to the second UE, responding to the sidelink RACH message received from the UE; and
reestablishing the first communications link between the first UE and the second UE based, at least in part, on the sidelink RACH response message.

16. A method for wireless communication performed by a second user equipment (UE), comprising:
communicating, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link, wherein the first communications link comprises a sidelink between the first UE and the second UE;
monitoring, during the awake state of the sidelink DRX mode, for the plurality of beam failure detection reference signals according to the periodicity for receiving the plurality of beam failure detection reference signals;
detecting that the first communications link between the first UE and the second UE has failed based on the monitoring; and
performing a sidelink beam failure recovery procedure to reestablish the first communications link between the first UE and the second UE, including:
receiving one or more sidelink synchronization signal blocks (SSBs) from the first UE based on the detection that the first communications link between the first UE and the second UE has failed; and
transmitting a sidelink random access channel (RACH) message to the first UE in response to the received one or more sidelink SSBs.

17. The method of claim 16, further comprising:
receiving, from the first UE, at least one beam failure detection reference signal of the plurality of beam failure detection reference signals based on the monitoring; and
transmitting a response message to the first UE, responding to the at least one beam failure detection reference signal.

18. The method of claim 17, wherein performing the sidelink beam failure recovery procedure comprises remaining in the awake state of the sidelink DRX mode.

19. The method of claim 17, wherein performing the sidelink beam failure recovery procedure further comprises:
receiving a sidelink RACH response message from the first UE based on the sidelink RACH message transmitted to the first UE; and
reestablishing the first communications link between the first UE and the second UE based on the sidelink RACH response message.

20. The method of claim 19, further comprising:
communicating with a base station (BS) on a second communications link between the second UE and the BS;
transmitting signaling to the BS indicating that the second UE is in an awake state of an access DRX mode associated with the second communications link; and
receiving at least one data transmission from the BS in response to the signaling indicating that the second UE is in the awake state of the access DRX mode associated with the second communications link.

21. The method of claim 20, wherein:
the awake state of the access DRX mode occurs at a period of time during which the second UE is scheduled to be in a sleep state of the access DRX mode; and
the second UE is in the awake state of the access DRX mode during the period of time which the second UE is scheduled to be in the sleep state of the access DRX mode based on the sidelink beam failure recovery procedure.

22. The method of claim 20, wherein transmitting the signaling to the BS indicating that the second UE is in the awake state of the access DRX mode comprises transmitting the signaling to the BS indicating that the second UE is in the awake state of the access DRX mode after the first communications link between the first UE and the second UE has been reestablished.

23. The method of claim 16, further comprising:
determining a change in the periodicity for transmitting the plurality of beam failure detection reference signals; and
adjusting at least one of the periodicity of the awake state of the sidelink DRX mode or a periodicity of a sleep state of the sidelink DRX mode based on the determined change in the periodicity for transmitting the plurality of beam failure detection reference signals.

24. The method of claim 23, wherein:
the determined change increases the periodicity for transmitting the plurality of beam failure detection reference signals; and
adjusting at least one of the periodicity of the awake state of the sidelink DRX mode or the periodicity of the sleep state of the sidelink DRX mode comprises at least one of increasing the periodicity of the awake state of the sidelink DRX mode or increasing the periodicity of the sleep state of the sidelink DRX mode.

25. The method of claim 23, wherein:
the determined change decreases the periodicity for transmitting the plurality of beam failure detection reference signals; and
adjusting at least one of the periodicity of the awake state of the sidelink DRX mode or the periodicity of the sleep state of the sidelink DRX mode comprises at least one of decreasing the periodicity of the awake state of the sidelink DRX mode or decreasing the periodicity of the sleep state of the sidelink DRX mode.

26. An apparatus for wireless communication by a first user equipment (UE), comprising:
a memory comprising executable instructions; and
one or more processors configured to execute the executable instructions and cause the apparatus to:
communicate, while operating in a sidelink discontinuous reception (DRX) mode, with a second UE on a first communications link between the first UE and the second UE, wherein the first communications link comprises a sidelink between the first UE and the second UE;
transmit, during an awake state of the sidelink DRX mode, at least one beam failure detection reference signal of a plurality of beam failure detection reference signals associated with the first communications link, wherein a periodicity of the awake state of the sidelink DRX mode is based on a periodicity for transmitting the plurality of beam failure detection reference signals; and
detect that the first communications link between the first UE and the second UE has failed based on the at least one beam failure detection reference signal, wherein the one or more processors are further configured to cause the apparatus to detect that the first communications link has failed further based on not receiving, within a threshold period of time, a response message from the second UE responding to the at least one beam failure detection reference signal.

27. An apparatus for wireless communication by a second user equipment (UE), comprising:
a memory comprising executable instructions; and
one or more processors configured to execute the executable instructions and cause the apparatus to:
communicate, during an awake state of a sidelink discontinuous reception (DRX) mode, with a first UE on a first communications link between the first UE and the second UE, wherein a periodicity of the awake state of the sidelink DRX mode is based on a periodicity for receiving a plurality of beam failure detection reference signals associated with the first communications link, wherein the first communications link comprises a sidelink between the first UE and the second UE; and
monitor, during the awake state of the sidelink DRX mode, for the plurality of beam failure detection reference signals according to the periodicity for receiving the plurality of beam failure detection reference signals;
detect that the first communications link between the first UE and the second UE has failed based on the monitoring; and
perform a sidelink beam failure recovery procedure to reestablish the first communications link between the first UE and the second UE, wherein, in order to perform the sidelink beam failure recovery procedure, the one or more processors are further configured to cause the apparatus to:
receive one or more sidelink synchronization signal blocks (SSBs) from the first UE based on the detection that the first communications link between the first UE and the second UE has failed; and
transmit a sidelink random access channel (RACH) message to the first UE in response to the received one or more sidelink SSBs.

* * * * *